US012561147B2

(12) United States Patent
Pinto

(10) Patent No.: US 12,561,147 B2
(45) Date of Patent: Feb. 24, 2026

(54) SYSTEM AND METHOD FOR UPDATING FIRMWARE OF HEADPHONES WITH DEDICATED EARPIECE CONTROLLERS

(71) Applicant: Bose Corporation, Framingham, MA (US)

(72) Inventor: Vishal Pinto, Shrewsbury, MA (US)

(73) Assignee: Bose Corporation, Framingham, MA (US)

( * ) Notice: Subject to any disclaimer, the term of this patent is extended or adjusted under 35 U.S.C. 154(b) by 252 days.

(21) Appl. No.: 18/157,474

(22) Filed: Jan. 20, 2023

(65) Prior Publication Data

US 2024/0248727 A1     Jul. 25, 2024

(51) Int. Cl.
*G06F 9/4401* (2018.01)
*G06F 8/654* (2018.01)
*H04R 5/033* (2006.01)

(52) U.S. Cl.
CPC ............ *G06F 9/4411* (2013.01); *G06F 8/654* (2018.02); *H04R 5/033* (2013.01)

(58) Field of Classification Search
None
See application file for complete search history.

(56) References Cited

U.S. PATENT DOCUMENTS 7,760,887 B2 * 7/2010 Oxford .................. H04R 27/00
                                                             381/59
7,826,318 B2 * 11/2010 Holden ............. H04L 12/40117
                                                           369/47.28

| | | | |
|---|---|---|---|
| 10,178,465 B2 * | 1/2019 | Grell | H04R 5/04 |
| 10,412,481 B1 * | 9/2019 | Wu | H04R 5/033 |
| 2012/0198434 A1 * | 8/2012 | Dirstine | G06F 8/65 |
| | | | 717/172 |
| 2015/0168934 A1 * | 6/2015 | Pai | G05B 19/0421 |
| | | | 700/20 |
| 2018/0181758 A1 * | 6/2018 | Branco | G06F 21/572 |
| 2020/0310780 A1 * | 10/2020 | Chen | G06F 9/4411 |
| 2021/0224061 A1 * | 7/2021 | Pillilli | G06F 21/572 |
| 2021/0377672 A1 * | 12/2021 | Grinnip, III | H04R 5/033 |

OTHER PUBLICATIONS

International Search Report and the Written Opinion of the International Searching Authority, International Application No. PCT/US2024/011419, dated Apr. 22, 2024, pp. 1-12.
International Preliminary Report on Patentability, International Patent Application No. PCT/US2024/011419, pp. 1-6, dated Jul. 22, 2025.

* cited by examiner

*Primary Examiner* — Elias Mamo
(74) *Attorney, Agent, or Firm* — Bond, Schoeneck & King, PLLC

(57) ABSTRACT

A system and method updating firmware of headphones with dedicated earpiece controller, including the steps of receiving a packet of data via a communication path, the communication path delivering the packet of data to the first controller and the second controller and being addressed to either the first controller or the second controller; determining whether the packet of data is addressed to the first controller; and in a first mode: execute at least one command stored in the packet of data only upon determining that the packet of data is addressed to the first controller; and in a second mode: update at least a portion of the first program code regardless of whether the packet is addressed to the first controller.

21 Claims, 5 Drawing Sheets

400

402

RECEIVE A PACKET OF DATA VIA A COMMUNICATION PATH

404

DOES THE PACKET CONTAIN AN
UPDATE TO THE PROGRAM CODE?

NO

YES

A

B

SYSTEM AND METHOD FOR UPDATING FIRMWARE OF HEADPHONES WITH DEDICATED EARPIECE CONTROLLERS

BACKGROUND

This disclosure generally relates to systems and methods for updating firmware of headphones with dedicated earpiece controllers.

SUMMARY

All examples and features mentioned below can be combined in any technically possible way.

According to an aspect, headphones include a first earpiece housing a first electroacoustic transducer and a first controller comprising a first processor and a first memory, the first memory storing a first program code, wherein the first program code is executed by the first processor during operation of the headphones; and a second earpiece housing a second electroacoustic transducer and a second controller comprising a second processor and a second memory, the second memory storing a second program code, wherein the second program code is executed by the second processor during operation of the headphones, wherein the first controller is programmed to receive a packet of data via a communication path, the communication path delivering the packet of data to the first controller and the second controller and being addressed to either the first controller or the second controller, and determine whether the packet of data is addressed to the first controller, wherein the first controller is programmed, in a first mode, to execute at least one command stored in the packet of data only upon determining that the packet of data is addressed to the first controller, and wherein the second controller is programmed, in a second mode, to update at least a portion of the first program code regardless of whether the packet is addressed to the first controller.

In an example, the first controller is programmed to enter the second mode when the packet of data contains an update to the first program code.

In an example, a portion of the second program code is persistent program code that is not updated in the second mode.

In an example, the persistent program code is a gain adjustment to a signal transduced by the first electroacoustic transducer.

In an example, the communication path is a wired communication path.

In an example, the communication path is a wireless communication path.

In an example, the headphones include a down-cable control module, wherein the communication path includes the down-cable control module.

In an example, the second controller is programmed to receive the packet of data via a communication path, and determine whether the packet of data is addressed to the second controller, wherein the second controller is programmed, in a first mode, to execute at least one command stored in the packet of data only upon determining that the packet of data is addressed to the second controller, and wherein the second controller is programmed, in a second mode, to update at least a portion of the second program code regardless of whether the packet is addressed to the first controller.

In an example, the first controller is further programmed, in the second mode, to send an acknowledgement over the communication path, upon receipt of the packet of data, when the packet of data is addressed to the first controller.

In an example, the first controller is further programmed, in the second mode, to send an acknowledgment over the communication path of receipt of the packet of data, upon receiving a query regarding receipt of the packet of data, when the packet of data is addressed to the second controller.

According to another aspect, a nontransitory storage medium being housed in a first earpiece of a pair of headphones including the first earpiece and a second earpiece, the non-transitory storage medium storing program code that, when executed by a processor, includes the steps of: receiving a packet of data via a communication path, the communication path delivering the packet of data to a first controller and a second controller and being addressed to either the first controller or the second controller, wherein the first controller is housed within the first earpiece and the second controller is housed within the second earpiece; determining whether the packet of data is addressed to the first controller; wherein, in a first mode, at least one command stored in the packet of data is executed only upon determining that the packet of data is addressed to the first controller; and wherein, in a second mode, at least a portion of the program code is updated regardless of whether the packet is addressed to the first controller.

In an example, the second mode is entered when the packet of data contains an update to the program code.

In an example, a portion of the program code is persistent program code that is not updated in the second mode.

In an example, the persistent program code is a gain adjustment to a signal transduced by an electroacoustic transducer disposed in the first earpiece.

In an example, the nontransitory storage medium further includes the steps of, in the second mode, sending an acknowledgement over the communication path, upon receipt of the packet of data, when the packet of data is addressed to the first controller.

The nontransitory storage medium of claim 15, further comprising the steps of, in the second mode, sending an acknowledgment over the communication path of receipt of the packet of data, upon receiving a query regarding receipt of the packet of data, when the packet of data is addressed to the second controller.

A method for updating program code stored in a nontransitory storage medium being housed in a first earpiece of a pair of headphones, the headphones including the first earpiece and a second earpiece, comprising the steps of: receiving a packet of data via a communication path, the communication path delivering the packet of data to a first controller and a second controller and being addressed to either the first controller or the second controller, wherein the first controller is housed within the first earpiece and the second controller is housed within the second earpiece; updating at least a portion of the program code regardless of whether the packet is addressed to the first controller upon determining that the packet of data includes an update to the program code stored.

In an example, a portion of the program code is persistent program code that is not updated.

In an example, the persistent program code is a gain adjustment to a signal transduced by an electroacoustic transducer disposed in the first earpiece.

In an example, the method further includes the steps of sending an acknowledgement over the communication path, upon receipt of the packet of data, when the packet of data is addressed to the first controller.

In an example, the method further includes the steps of sending an acknowledgment over the communication path of receipt of the packet of data, upon receiving a query regarding receipt of the packet of data, when the packet of data is addressed to the second controller.

The details of one or more implementations are set forth in the accompanying drawings and the description below. Other features, objects, and advantages will be apparent from the description and the drawings, and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

Certain types of headphones, such as aviation headphones or true wireless headphones, feature dedicated controllers in each earpiece, which permit each earpiece to function with some measure of independence. In the true wireless headphone context, each earpiece is typically equipped with a separate Bluetooth controller to allow each earpiece to receive signals without the use of a connective wire. In the aviation headphone context, the separate controllers typically permit the wearer to assign different functions to each earpiece. For example, one earpiece may be in a noise-cancellation mode, to reduce ambient engine sounds, while the other earpiece may be in a transparency mode to permit the wearer to hear the person sitting next to the wearer, such as a co-pilot.

These headphones typically require periodic firmware updates, be it an update of the wireless protocol that the dedicated controllers use or an update from a manufacturer to add functionality or to eliminate a bug. In these cases, both controllers require the same update, but to maintain independence, each controller is programmed to only respond to respond to packets addressed directly to it and to discard packets addressed to the other controller. This means that each update must be sent twice, once as an update addressed to one earpiece controller and again as an update addressed to the other earpiece controller, effectively doubling the time required to update the firmware of the headphones. This becomes a particular challenge during manufacture, where efficient use of time is of paramount importance. There exists, then, a need in the art to shorten the time required to update the firmware of headphones that use dedicated earpiece controllers.

Figure 1:
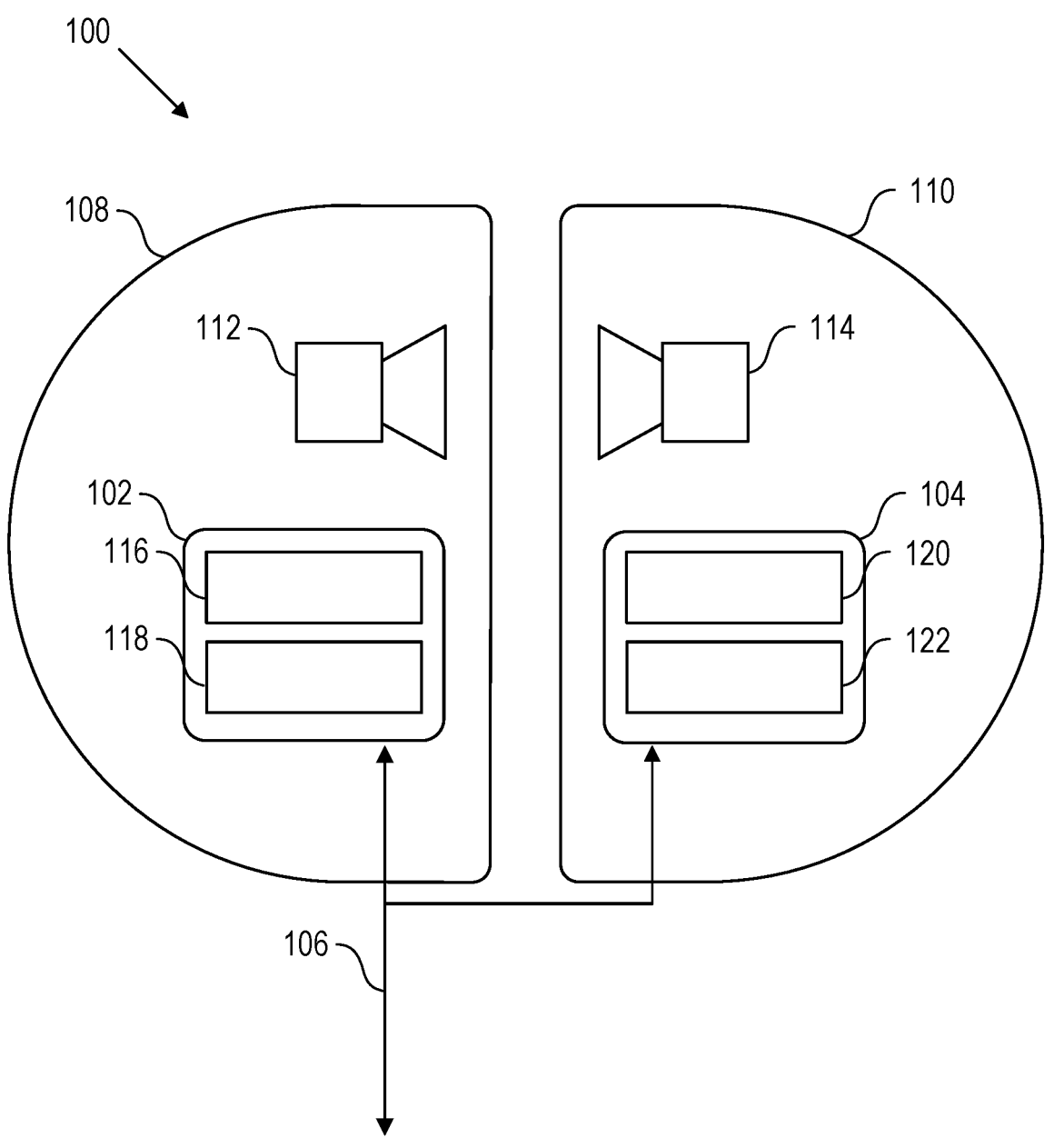
FIG. 1 depicts a block diagram of a pair of headphones with dedicated earpiece controllers, according to an example.

Referring to FIG. 1, there is shown a block diagram of a pair of headphones 100 that includes at least two separate controllers, controller 102 and controller 104, each programmed to have two modes for receiving data over a communication path 106: (1) a first mode for receiving commands, and (2) a second mode for receiving updates. In the first mode, controller 102 and controller 104 each executes only commands addressed to it, discarding any commands addressed to the other controller. In the second mode, controller 102 and controller 104 each accepts update data regardless of which of controller the update data is addressed to. By accepting any data packet in the second mode, both controller 102 and controller 104 can be updated simultaneously using a single transmitted updated, while retaining the ability to discriminate between addressed commands in the first mode.

In certain examples, controller 102 and controller 104 each operates in the first mode or second mode according to the type of data received. Thus, when receiving update data via communication path 106, controller 102 and controller 104 operate in the second mode, but while receiving command data, operate in the first mode. In an example, each packet of data can include an identifier, such as a flag, that designates the packet as a command packet or an update packet. In alternative examples, each of controllers 102, 104 can receive a separate addressed command that informs controllers 102, 104 to assume either the first mode or the second mode for the data packets that follow.

Controllers 102 and 104 are respectively housed within separate earpieces. Thus, earpiece 108 houses controller 102 and earpiece 110 houses controller 104. Each earpiece 108, 110, when in use, can receive an audio signal and provide an acoustic signal to a respective ear of a user. To that end, earpiece 108 and earpiece 110 further houses at least one electroacoustic transduce: earpiece 108 including electroacoustic transducer 112 and earpiece 110 including electroacoustic transducer 114. Electroacoustic transducer 112 and electroacoustic transducer 114 each receives the audio signal and transduces it to the acoustic signal.

Controllers 102 and 104 each comprises a processor and a memory storing program code for execution by the processor to perform the various functions necessary to operate each ear cup, including steps of method 400, described below. Particularly, controller 102 comprises processor 116 and memory 118, while controller 104 comprises processor 120 and memory 122. (It should that the processor and memory of each controller 102, 104 need not be within same housing, such as part of a dedicated integrated circuit, but can be disposed in separate housings. Further, a single controller can include multiple physically distinct memories to store the program code necessary for its functioning and can include multiple processors for executing the program code. Additionally, the term "updating" for the purposes of this disclosure, can refer to initially writing data to memory, or it can refer to overwriting existing data.)

In various examples, controllers 102, 104 can further be programmed to receive an input from one or more microphones (e.g., disposed in or on the respective earpiece) and provide either a noise-cancellation signal through electroacoustic transducer 112, or a hear-through signal, based on the microphone signal. Methods for producing noise-cancellation signals or hear-through signals are known in the art and will not be discussed further here-any suitable methods can be used. Further, controllers 102, 104 in certain examples, can be programmed to receive a wireless signal, e.g., music, and to produce an acoustic signal, based on the wireless signal, via the electroacoustic transducer 112, 114. The memory can be any suitable form of memory, including EPROM, EEPROM, Flash EPROM, etc.

In various examples, each controller 102, 104 can be programmed to send an acknowledgement when a data packet addressed to it is successfully received. Thus, for example, controller 102 will acknowledge commands addressed to it, but will not acknowledge commands addressed to controller 104. This means that, for example, after an update, controller 102, receiving update packets addressed to controller 104, will not send an acknowledgement. To address this, controller 102, to which data packets are not addressed, can be separately queried about successful receipt of the data packets. For example, controller 102, receiving update data addressed to controller 104, will only acknowledge after receiving a separate query regarding the successful receipt data. In an alternative example, rather than only responding to data packets addressed to it, each controller 102, 104 can respond to each data packet with an acknowledgement that states whether the received packet was retained or discarded.

Further, certain portions of memory containing persistent data, such as user or manufacturer settings, can be set or otherwise adjusted in the first mode, but remain excepted from any updates during in the second mode. For example, if a user suffers from diminished hearing in one ear, one of controllers 102, 104 can be programmed to increase the gain of the appropriate acoustic signal to compensate. Generally, it is not desirable for such setting information to be overwritten during an update. This kind of setting can be stored in persistent memory, which is not updated. The portion of memory, can, in an example, be certain a block of memory, or can be a separate physical memory structure.

In an example, the communication path 106 can be a wired communication path, such as cable that splits to be received at each earpiece. Alternatively, wired communication path 106 can be received at earpiece 108 and forwarded or otherwise carried through a second cable to the earpiece 110. Indeed, communication path can comprise any suitable medium for transferring data to both the first controller and the second controller (i.e., a bus). For example, the communication path can include a cable received at the earpiece 108, and a second cable that extends from the first earpiece to the earpiece 110 across the headband that connects them. In an alternative example, the communication path could be a wireless communication path, received using a communication protocol such as Bluetooth or Wi-Fi. In yet another example, the communication path 106 could be wireless in part and wired in part, such as a wireless signal received at the earpiece 108 and then forwarded to earpiece 110 across a cable extending from the first earpiece to the second earpiece. Regardless of the configuration of communication path 106, the same signal is received at both controllers 102, 104.

The source of the update can be any suitable device for delivering the update. Typically, though, the update originates with a manufacturer and is downloaded onto a local device, such as a personal computer, which then transmits the update to headphones over the communication path 106. It is preferable, though not necessary, for the update to be transmitted over a wired communication path, such as a USB cable, since a wireless communication path is more prone to disruption, such as a user walking out of range, before the update is complete.

The structure of headphone 100 and earpieces 108, 110 can have different form factors in various examples. For example, in the example of FIG. 1, headphones 100 can be a pair of over-the-ear headphones, in which case, earpieces 108, 110 can be ear cups that fit over a user's ears. In this example, communication path 106 typically, although not necessarily always, includes a conductive path (e.g., a wire) that extends between controller 102 and controller 104 (e.g., extending through the headband). In alternative example, headphones 100 can be in-ear headphones, in which case, the communication path can also be a wired or wireless (e.g., if both headphones are true-wireless headphones). These are only provided as examples, and it will be understood by a person of ordinary skill in the art that headphones can adopt any number of form factors and be used in a variety of contexts, including open-back headphones, closed-back headphones, on-ear headphones, open-ear headphones, earbuds, etc. Further, headphones can be specialized for particular uses, such as hearing aids, or, as in the example of FIG. 2, aviation headphones. Generally, the examples and methods described in this disclosure can be used for any headphones having multiple controllers.

Figure 2:
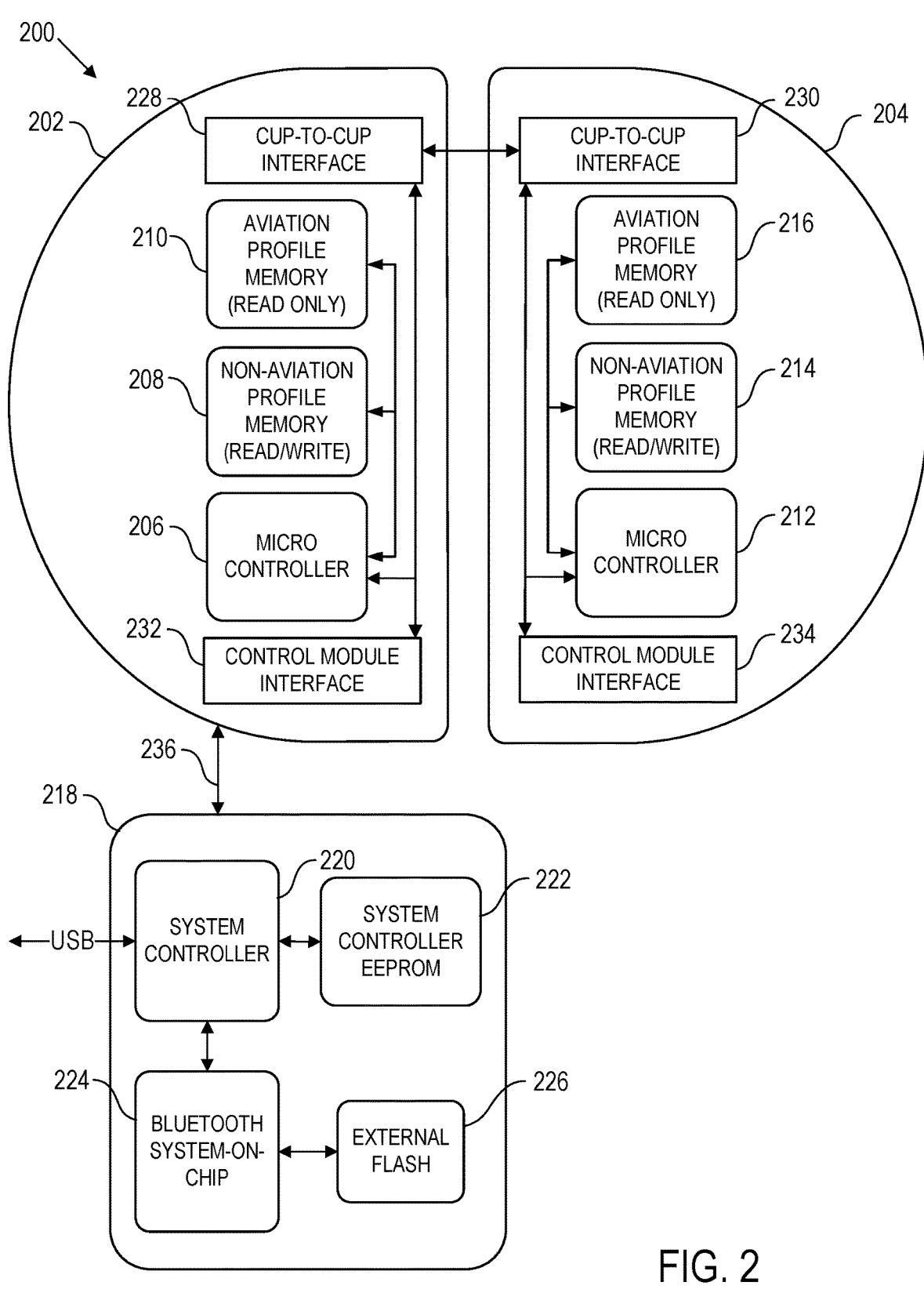
FIG. 2 depicts a block diagram of a pair of aviation headphones with dedicated earpiece controllers, according to an example.
Figure 3:
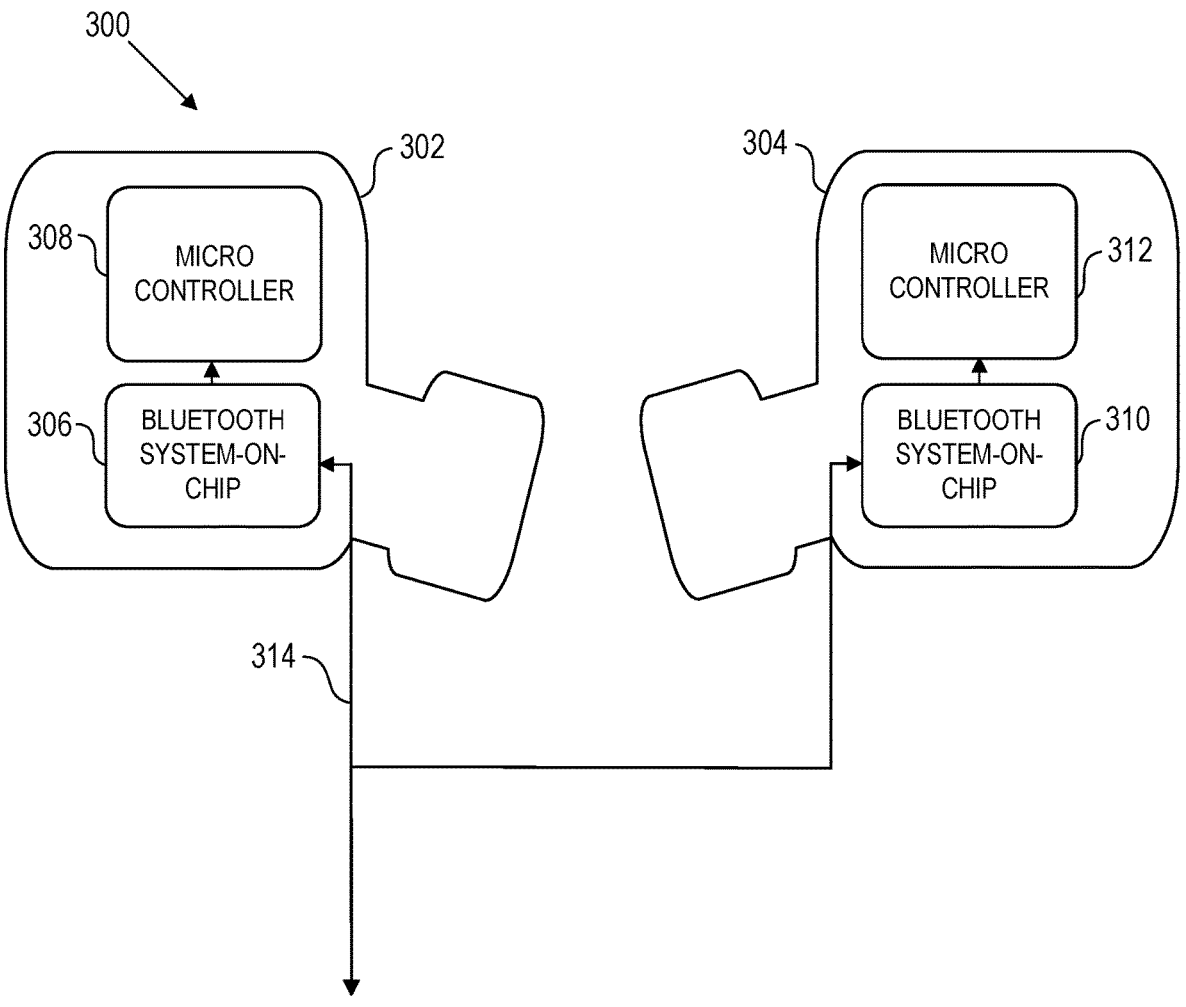
FIG. 3 depicts a block diagram of a pair of true wireless headphones with dedicated earpiece controllers, according to an example.

FIGS. 2 and 3 depict block diagrams of examples of headphones 100. Specifically, FIG. 2 depicts a block diagram of an example pair of aviation headphones 200 and FIG. 3 depicts a block diagram of a pair of true wireless headphones. To focus the discussion, only the components associated with updating the various controllers have been depicted in these block diagrams, thus electroacoustic transducers, such as speakers or microphones, have been excluded.

FIG. 2 depicts a block diagram of an example pair of aviation headphones 200. As shown, headphones 200 include a controller in left ear cup 202, comprising microcontroller 206, an aviation profile memory 210, and a non-aviation profile memory 208. Headphones 200 further include a controller in right ear cup 204 comprising a microcontroller 212, a non-aviation profile memory 214, and an aviation profile memory 216. Each microcontroller 206, 212 can implement a noise-cancellation or hear-through mode, according to user inputs. Further, aviation profile memory 210, 216 can store profile information, related to functions specific to kinds of aircraft, as well as persistent user-defined settings (such as a gain adjustment to an ear cup to address diminished hearing in one ear). Non-aviation profile memory 208, 214 can further include three definable active noise-cancellation profiles. The profiles stored in aviation profile memory 210, 216 and non-aviation profile memory 208, 214 are available to microcontrollers 206, 212, to configure the noise-cancellation profiles of aviation headphones 200 as appropriate.

Aviation headphones 200 further comprise a down-cable controller 218 comprising a system controller 220 in communication with system controller memory 222, and Bluetooth system-on-chip 224 in communication with external flash memory 226. In this example, communication path comprises a cable 232 that delivers data from down-cable controller 218 through a cable 236 that extends through the headband of headphones 200, between cup-to-cup interface 228 in left ear cup 202 and cup to cup interface 230 in right earcup 204.

During normal operation, headphones 200 can receive user commands, via, e.g., tap controls on at least one of ear cups 202, 204. The tap control signals are transmitted to down-cable controller 218, which determines the tap control input by user and sends a signal addressed to the appropriate ear cup 202, 204 controller. For example, as described above, tap control may set one ear cup 202, 204 to hear-through mode, while the other remains in noise-cancellation mode. In this mode, commands from down-cable controller 218 are addressed, through, for example, a header in the packets of data delivered through cable 236 to earcups. In another example, the volume of ear cups 202, 204 can be adjusted independently, via, e.g., left and right volume control wheels on down-cable controller 218.

In the first mode, each of microcontrollers 206, 212 responds only to data packets (e.g., related to tap controls or volume controls) addressed to it and discards packets addressed to the other microcontroller. Thus, a tap control addressed to the ear cup 202 controller will be executed by ear cup 202 controller but discarded by ear cup 204 controller. Likewise, a volume control directed to ear cup 204 controller will be executed by ear cup 204 controller but discarded by ear cup 202 controller.

During an update, however, data packets are sent through down-cable controller 218 (the communication path thus including down-cable controller 218) to ear cups 202, 204. While packets can be addressed to either of controllers in ear cups 202, 204, each controller, in the second mode, will perform the update using the packet, regardless of which controller the packet is addressed to. For example, the update packet might include an update addressed to aviation profile memory 210 but will be used by the bootloader in microcontroller 212 to also update aviation profile memory 216 with the same update. Conversely, the update might be addressed to microcontroller 212, but will also be used by the bootloader of microcontroller 206 to update itself.

The controller the update is addressed to can acknowledge the update packet. Thus, if the update is addressed to the controller in the ear cup 202, microcontroller 206 will acknowledge the packet, even when the update is used to update the controller in ear cup 204 as well. The controller to which the update was not addressed can be separately queried about whether the update was successfully received. Thus, for example, down-cable controller 218 can send a query to ear cup 204 controller about whether the update originally addressed to the controller of ear cup 202 was successfully received, to which microcontroller 212 can acknowledge.

Turning now to FIG. 3, there is shown a block diagram of a pair of an example true wireless headphones 300. In this example, headphones 300 are in-ear headphones that comprise a left earpiece 302 and a right earpiece 304. Left earpiece 302 includes a controller comprising a Bluetooth system-on-chip 306 and a microcontroller 308. Right earpiece 304 includes a controller comprising a Bluetooth system-on-chip 310 and a microcontroller 312. The controllers of left earpiece 302 and right earpiece 304 receive signals via communication path 314, which, in this example, is a wireless Bluetooth connection to a source, such as a mobile phone. In certain examples, however, communication path 314 can comprise a wired connection to a case or dock, which can be used to charge and to update headphones 300. In this example, the case or dock can itself include a controller that can store and direct the update to headphones 300 when placed within or on the case or dock.

In operation, signals are received at Bluetooth system-on-chip 306 and 310 and relayed, respectively, to microcontrollers 308 and 312. Microcontrollers 308 and 312 can control various functions of earpiece such as the production of noise-cancellation or hear-through signals, as well as receiving inputs from a user, using, for example, touch controls on the outer surface of earpieces 302, 304. In this case, a user providing a control input, such as pause playback or turn on noise-cancellation mode, can be input to a signal earpiece (e.g., earpiece 302), processed by one of controllers (e.g., microcontroller 308) and relayed, via the Bluetooth system-on-chip (e.g., Bluetooth system-on-chip 306), to the other earpiece (e.g., earpiece 304) to match the state of the earpiece to which the control input was entered.

During an update, as described in the examples of headphones 100 and 200, update packages received over communication path 314 addressed to a single controller can be received and implemented by both controllers in earpieces 302 and 304. Furthermore, successful receipt of the packet can be acknowledged by the controller to which the packets are addressed. The controllers to which the packets are not addressed can be separately queried (e.g., by the source of the update, or by the case/dock) an acknowledge successful receipt.

Figure 4A:
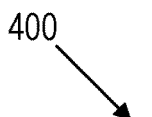
FIG. 4A depicts a portion of a flowchart of a method for updating firmware of headphones with dedicated earpiece controllers.
Figure 4A:
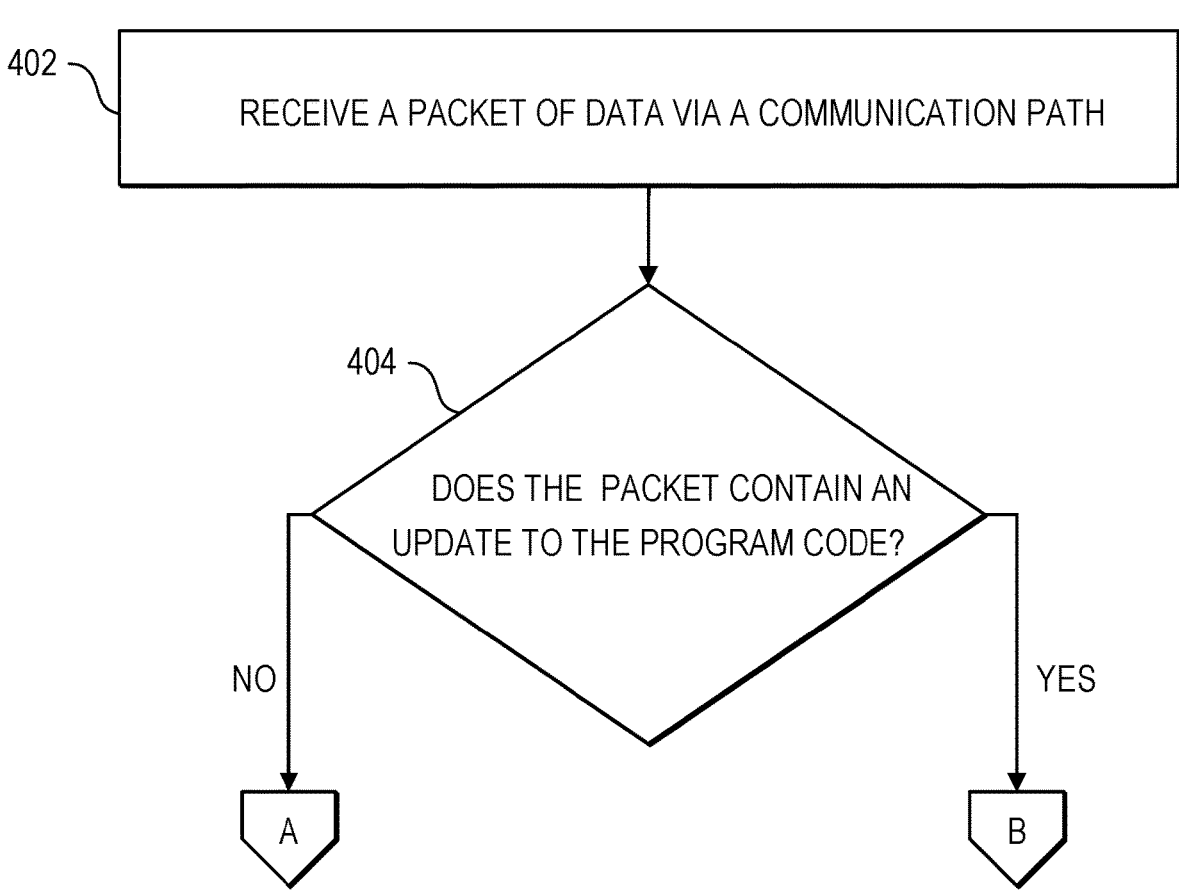
Figures 4B, 4C:
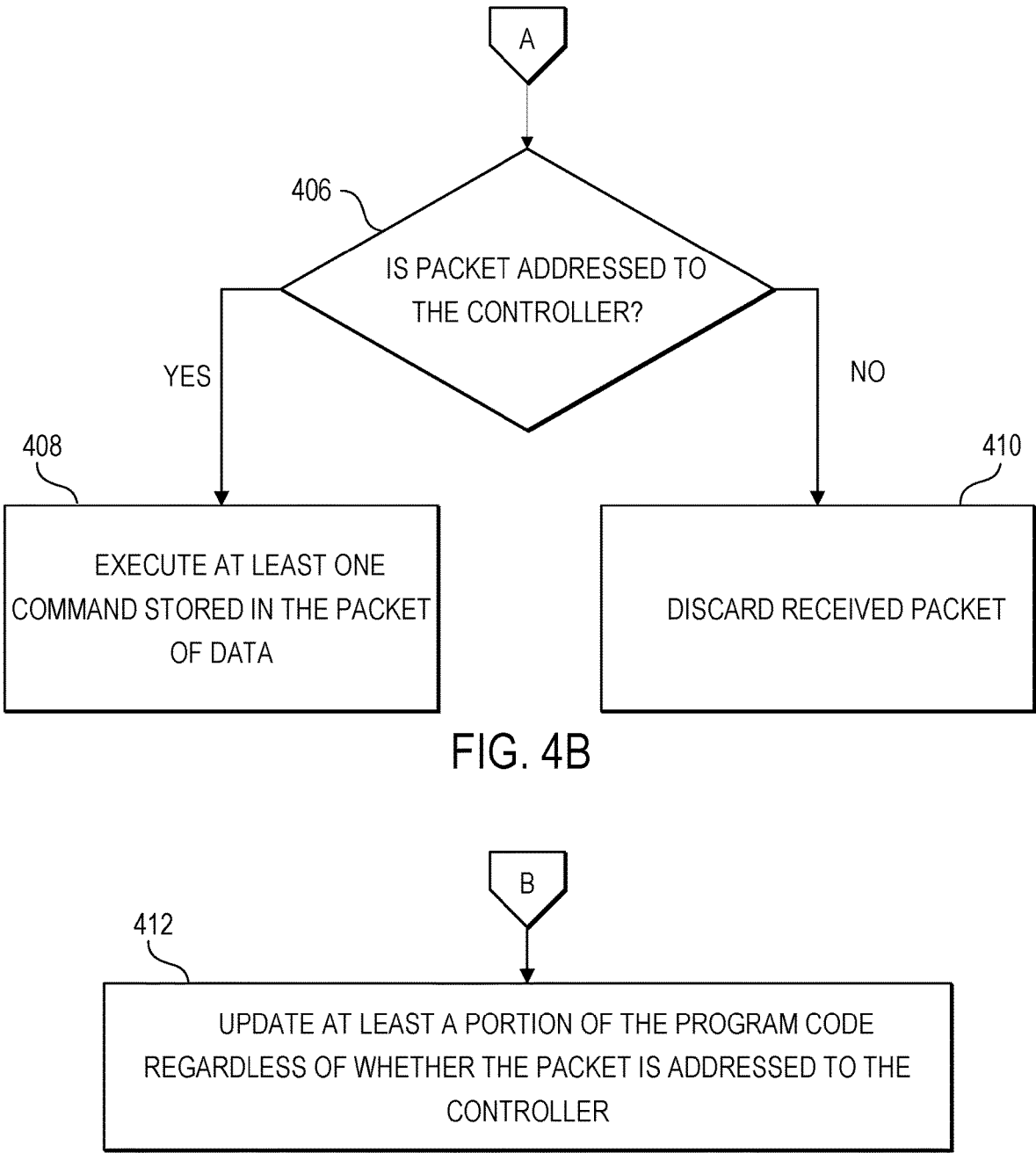
FIG. 4B depicts a portion of a flowchart of a method for updating firmware of headphones with dedicated earpiece controllers.
FIG. 4C depicts a portion of a flowchart of a method for updating firmware of headphones with dedicated earpiece controllers.

FIGS. 4A-4C depict a method 400 for updating headphones with dedicated earpiece controllers, such as described in connection with FIGS. 1-3. More particularly, headphones can comprise a first earpiece housing a first electroacoustic transducer and a first controller that comprises a first processor and a first memory, and a second earpiece housing a second electroacoustic transducer and a second controller that comprises a second processor and a second memory. Further, both controllers can receive the same packets of data via a communication path, which can be a wired or wireless communication, or some combination of a wired or wireless communication path. The communication path can further include controllers, such as a down-cable controller or case/dock for wireless headphones. The data packets are each addressed to either the first controller or to the second controller.

It should further be understood that the processor and memory of each controller need not be disposed within same housing, such as part of a dedicated integrated circuit, but can be disposed in separate housings and can include multiple processors for executing the program code. Further, a single controller can use include multiple physically distinct memories to store the program code necessary for its functioning.

Method 400 can be executed in parallel by each of the first controller and the second controller to manage data packets delivered to first controller and second controller and to initiate an update, as appropriate, in efficient manner that does not require sending update packets to each controller individually.

At step 402, a packet of data is received via the communication path. As mentioned above, the packet of data is addressed to either the first controller or the second controller.

At step 404, it is determined whether the packet of data contains an update to the program code stored in the memory of the controller (e.g., a firmware update). In other words, some portion of the program code that dictates the way the first controller and second controller operate is being received for the first time or such existing program code is being overwritten, such that the first controller and second controller operate in a different manner or include some new functionality. This determination can include checking whether a flag that identifies the packet as an update is set; however, any suitable method for determining whether the packet is an update can be used. If the packet is not an update, the controller operates in the first mode and the method proceeds to step 406 (FIG. 4B). Otherwise, if the packet is an update, the controller operates in the second mode and the method proceeds step 412 (FIG. 4C). (It should also be understood that this determination can be made in the negative: i.e., by determining that the packet is or is not a command, which, for the purposes of this discussion, is a method of determining whether the packet is an update.) As an alternative to step 404, the controller can otherwise be notified that the incoming data packet is an update and can operate in the second mode or first mode without determining whether the packet itself is an update.

At step 406, if the packet is not an update, the controller determines whether the packet is addressed to it. Thus, method 400, as implemented by the first controller, determines whether the packet is addressed to the first controller. Likewise, method 400 as implemented by the second controller, determines whether the packet is addressed to the second controller. If the packet is not addressed to it, at step 408, the controller executes at least one command stored in the packet of data (e.g., enter a noise-cancellation, enter a hear-through mode, etc.). If, however, the packet is addressed it, at step 410 the packet is discarded (i.e., the controller takes no further action based on what is contained in the packet).

At step 412, if the packet is an update, the controller operates in the second mode and the program code stored in the non-transitory storage medium is updated regardless of whether the packet of data is addressed to the controller. Thus, if the first controller is executing method 400 and the packet is addressed to the second controller, first controller will continue to update.

As part of this step, a certain portion of the program code can be excepted from the update, such that the certain settings or manufacturing data can be maintained persistently throughout operation of the device. For example, certain settings, such as increasing the gain of a particular earpiece to account for diminished hearing, can be retained throughout the update process.

Further, at the close of step 408, 410, or 412, an acknowledgement can be sent if the packet of data was successfully received and is addressed to the controller. If the packet of data was not addressed to the controller, the controller can wait for and acknowledge a separate query regarding correct receipt of the data, received over the communication path.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. Headphones, comprising:
a first earpiece housing a first electroacoustic transducer and a first controller comprising a first processor and a first memory, the first memory storing a first program code, wherein the first program code is executed by the first processor during operation of the headphones; and
a second earpiece housing a second electroacoustic transducer and a second controller comprising a second processor and a second memory, the second memory storing a second program code, wherein the second program code is executed by the second processor during operation of the headphones,
wherein the first controller is programmed to
receive a packet of data via a communication path, the communication path delivering the packet of data to the first controller and the second controller and being addressed to either the first controller or the second controller, and
wherein the first controller is programmed, in a first mode, to determine whether the packet of data is addressed to the first controller and to execute at least one command stored in the packet of data only upon determining that the packet of data is addressed to the first controller, and
wherein the first controller is programmed, in a second mode, to update at least a portion of the first program code regardless of whether the packet is addressed to the first controller.

2. The headphones of claim 1, wherein the first controller is programmed to enter the second mode when the packet of data contains an update to the first program code.

3. The headphones of claim 1, wherein a portion of the second program code is persistent program code that is not updated in the second mode.

4. The headphones of claim 3, wherein the persistent program code is a gain adjustment to a signal transduced by the first electroacoustic transducer.

5. The headphones of claim 1, wherein the communication path is a wired communication path.

6. The headphones of claim 1, wherein the communication path is a wireless communication path.

7. The headphones of claim 1, wherein the headphones include a down-cable control module, wherein the communication path includes the down-cable control module.

8. The headphones of claim 1, wherein the second controller is programmed to receive the packet of data via a communication path, and wherein the second controller is programmed, in a first mode, to determine whether the packet of data is addressed to the first controller and to execute at least one command stored in the packet of data only upon determining that the packet of data is addressed to the second controller, and wherein the second controller is programmed, in a second mode, to update at least a portion of the second program code regardless of whether the packet is addressed to the first controller.

9. The headphones of claim 1, wherein the first controller is further programmed, in the second mode, to send an acknowledgement over the communication path, upon receipt of the packet of data, when the packet of data is addressed to the first controller.

10. The headphones of claim 9, wherein the first controller is further programmed, in the second mode, to send an acknowledgment over the communication path of receipt of the packet of data, upon receiving a query regarding receipt of the packet of data, when the packet of data is addressed to the second controller.

11. A nontransitory storage medium being housed in a first earpiece of a pair of headphones including the first earpiece and a second earpiece, the nontransitory storage medium storing program code that, when executed by a processor, comprises the steps of:

receiving a packet of data via a communication path, the communication path delivering the packet of data to a first controller and a second controller and being addressed to either the first controller or the second controller, wherein the first controller is housed within the first earpiece and the second controller is housed within the second earpiece;

wherein, in a first mode, at least one command stored in the packet of data is executed only upon determining that the packet of data is addressed to the first controller, and wherein, in a second mode, at least a portion of the program code is updated regardless of whether the packet is addressed to the first controller.

12. The nontransitory storage medium of claim 11, wherein the second mode is entered when the packet of data contains an update to the program code.

13. The nontransitory storage medium of claim 11, wherein a portion of the program code is persistent program code that is not updated in the second mode.

14. The nontransitory storage medium of claim 13, wherein the persistent program code is a gain adjustment to a signal transduced by an electroacoustic transducer disposed in the first earpiece.

15. The nontransitory storage medium of claim 11, further comprising the steps of, in the second mode, sending an acknowledgement over the communication path, upon receipt of the packet of data, when the packet of data is addressed to the first controller.

16. The nontransitory storage medium of claim 15, further comprising the steps of, in the second mode, sending an acknowledgment over the communication path of receipt of the packet of data, upon receiving a query regarding receipt of the packet of data, when the packet of data is addressed to the second controller.

17. A method for updating program code stored in a nontransitory storage medium being housed in a first earpiece of a pair of headphones, the headphones including the first earpiece and a second earpiece, comprising the steps of:

receiving a packet of data via a communication path, the communication path delivering the packet of data to a first controller and a second controller and being addressed to either the first controller or the second controller, wherein the first controller is housed within the first earpiece and the second controller is housed within the second earpiece;

updating at least a portion of the program code regardless of whether the packet is addressed to the first controller upon determining that the packet of data includes an update to the program code stored.

18. The method of claim 17, wherein a portion of the program code is persistent program code that is not updated.

19. The method of claim 18, wherein the persistent program code is a gain adjustment to a signal transduced by an electroacoustic transducer disposed in the first earpiece.

20. The method of claim 17, further comprising the steps of sending an acknowledgement over the communication path, upon receipt of the packet of data, when the packet of data is addressed to the first controller.

21. The method of claim 17, further comprising the steps of sending an acknowledgment over the communication path of receipt of the packet of data, upon receiving a query regarding receipt of the packet of data, when the packet of data is addressed to the second controller.

* * * * *